United States Patent
Hartmann et al.

[15] 3,684,241
[45] Aug. 15, 1972

[54] BALL VALVE

[72] Inventors: Leonard Hartmann, Maplewood; Joseph S. Sciuto, Jr., Crestwood, both of Mo.

[73] Assignee: Stile-Craft Manufacturers, Inc., St. Louis, Mo.

[22] Filed: Aug. 31, 1970

[21] Appl. No.: 68,219

[52] U.S. Cl. ................................................251/315
[51] Int. Cl. ..............................................F16k 5/06
[58] Field of Search......251/170, 172, 175, 315, 317, 251/360; 137/315

[56] References Cited

UNITED STATES PATENTS

| | | |
|---|---|---|
| 3,331,581 | 7/1967 | O'Connor..............251/170 X |
| 3,458,171 | 7/1969 | Urban....................251/175 X |
| 2,989,990 | 6/1961 | Bass et al...............251/172 X |
| 3,557,832 | 1/1971 | Mueller et al. .......137/625.22 |

*Primary Examiner*—M. Cary Nelson
*Assistant Examiner*—David R. Matthews
*Attorney*—Cohn & Powell

[57] ABSTRACT

The valve includes a body having aligned inlet and outlet ports intercommunicating by means of a central conduit passing through a rotatable ball mounted in the housing. The conduit permits fluid flow through the valve when the valve is in an open position and is alignable with the inlet and outlet ports. The rotatable ball is seated on sealing elements which are preloaded to provide sealing in both the open and closed valve positions.

7 Claims, 10 Drawing Figures

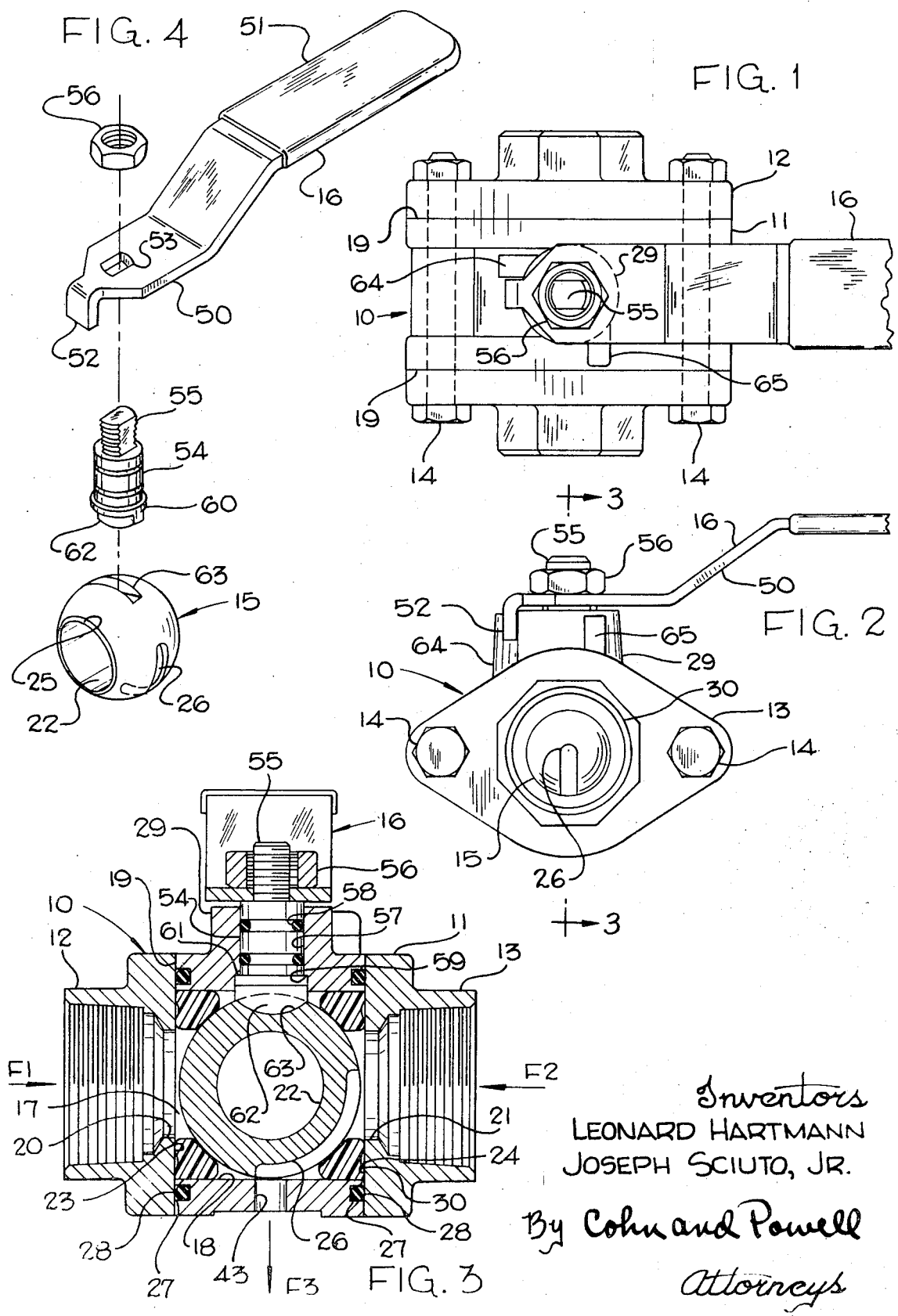

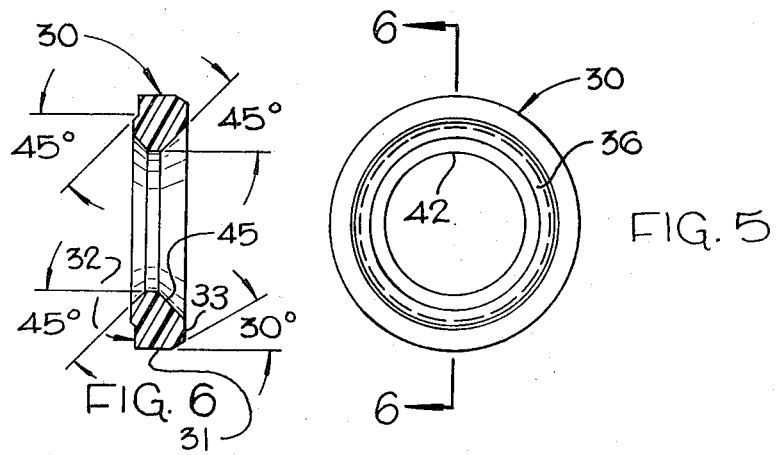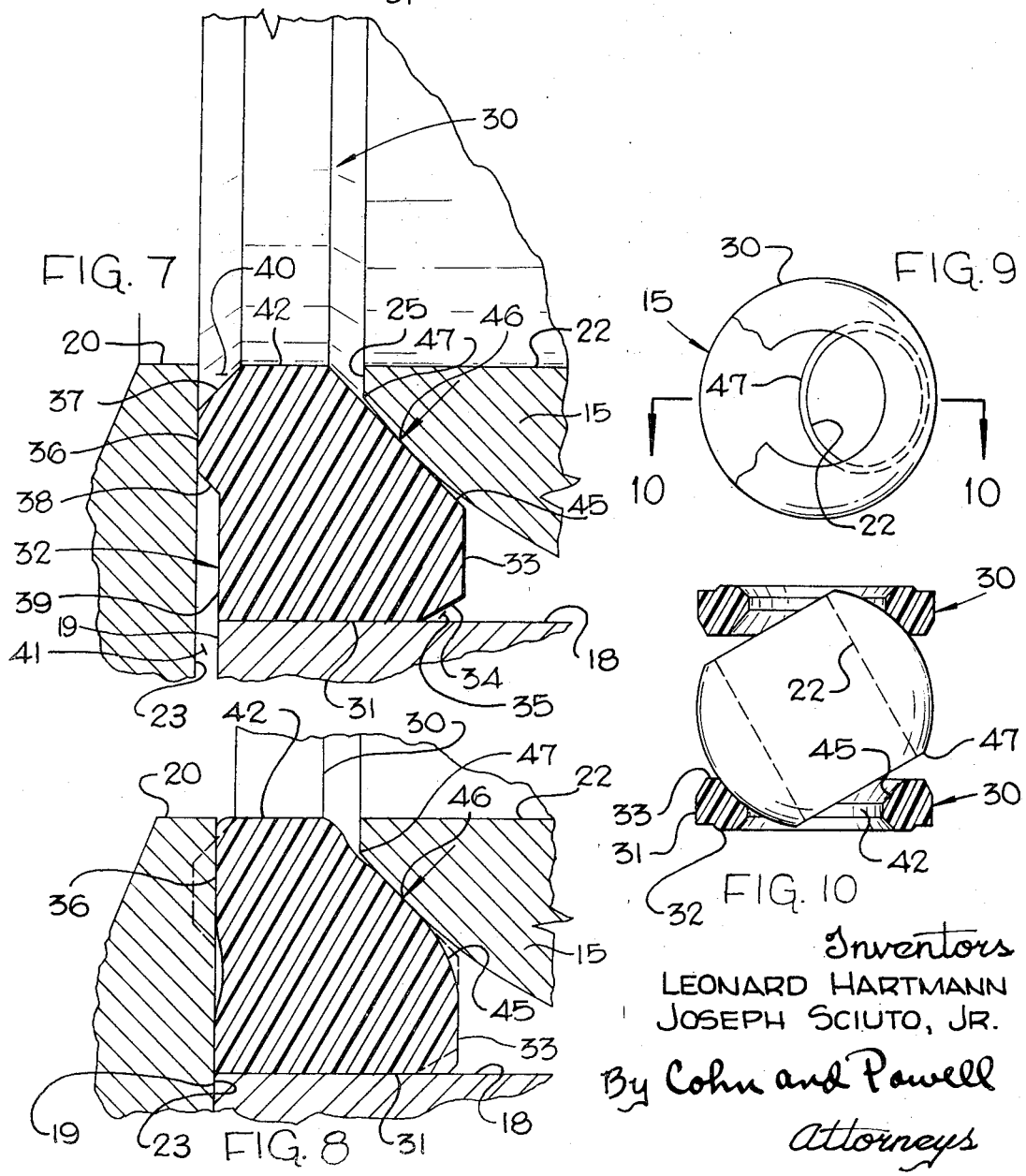

BALL VALVE

BACKGROUND OF THE INVENTION

This invention relates in general to a ball valve and in particular to the ball seating elements sealing the rotatable ball from the valve housing.

Ball valves are commonly used to provide an efficient means of cutting off main line flow in hydraulic systems and this type of valve is particularly valuable in situations which require that cut-off be virtually instantaneous as opposed, for example, to the much slower action of the common gate valve.

All hydraulic systems and particularly those under high pressure are susceptible to leakage. Thus, it is imperative that valves in such systems be provided with seals capable of efficient sealing action. In ball valves in particular, it is essential that the seal between the rotatable ball and the valve housing be completely effective. Simple O-rings having, for example, a circular cross section, have not proven to be adequate for this purpose because applying pressure to the O-ring tends to cause the ball to bind. O-rings having a more complex configuration have been used in an attempt to overcome the problem, and one such O-ring includes a projecting, relatively flexible angular lip which is adapted to engage the ball under an initial pressure and to flex under a greater degree of pressure so that the ball is supported by the body of the O-ring rather than the lip. The disadvantage of this form of O-ring is that the lip configuration is unusually complicated which leads to high production costs. Further, the force variation applied to the necessarily slender lip tends to induce high stresses into the lip. On the other hand, if the lip is thickened, it becomes relatively less flexible and hence more susceptible to binding against the surface of the ball.

SUMMARY OF THE INVENTION

The sealing O-ring elements in this ball are adapted to be compressed into bearing engagement with the rotatable ball and yet avoid binding of the ball against the material of the O-ring as the valve is rotated.

The O-ring cross section has a configuration such that when pressure is applied to one portion of the ring, the material is redistributed in a predetermined manner to avoid pressure build-up at undesirable locations. To this end, the configuration of the ring includes depressed portions which are out of contact with the housing initially yet form voids capable of accommodating a redistribution of the ring material when the ring is subjected to external pressure.

The ball valve includes a body having a valve chamber with communicating inlet and outlet ports defined by relatively movable abutment means at either end of the chamber.

A rotatable ball is disposed within the chamber, the ball including a conduit selectively communicating with said inlet and outlet ports. The ball is seated on compressible sealing rings at each end of the chamber and means are provided to urge the abutment means into engagement with the ball.

Each compressible sealing ring includes a transverse front face having a shoulder engageable with an associated abutment means and a depressed portion disposed radially adjacently of said shoulder, said depressed portion cooperating with said abutment means to define a void when the ring is uncompressed, the void being progressively diminished by redistribution of the ring material as pressure is applied from the abutment means to the ring. Each ring also includes an oblique seating face engaging the ball radially outwardly of the innermost engagement between the abutment means and the shoulder means.

The depressed portion of the transverse face includes a first depressed portion disposed radially inwardly of the shoulder means and a second depressed portion disposed radially outwardly of the shoulder means.

Each ring includes a cylindrical outer face received within the substantially cylindrical valve chamber and each ring includes a depressed portion contiguous with the cylindrical face of the ring and cooperating with said valve chamber to define a void when the ring is uncompressed, said void being progressively diminished by redistribution of the ring material as the abutment portions are urged toward each other.

The body includes an intermediate portion and flanking end portions which are connected thereto, said end portions providing the abutment means. Fastening means draw the end portions into clamped relation with the intermediate portion thereby applying pressure to the ring and hence sealing the ball.

BRIEF DESCRIPTION OF THE DRAWINGS

FIG. 1 is a plan view of the valve in the cut-off position 1

FIG. 2 is an end elevational view;

FIG. 3 is a sectional elevational view taken on line 3—3 of FIG. 2;

FIG. 4 is an exploded view of the actuating mechanism;

FIG. 5 is an elevational view of the sealing ring;

FIG. 6 is a cross sectional view taken on line 6—6 of FIG. 5;

FIG. 7 is an enlarged fragmentary view of the ring before compression thereof;

FIG. 8 is an enlarged fragmentary view of the ring after compression thereof;

FIG. 9 is a fragmentary view of the ring showing the ball in an intermediate position, and FIG. 10 is a plan view taken on line 10—10 of FIG. 9.

DESCRIPTION OF THE PREFERRED EMBODIMENT

Referring now by characters of reference to the drawings, and first to FIGS. 1 and 2, it will be understood that the ball valve includes a housing 10 constituting a body. The housing 10 includes an intermediate portion 11 and end portions 12 and 13 flanking the intermediate portion 11 and detachably attached thereto. The attachment is by pair of fasteners 14 which extend between the body portions and constitute a means by which the end portions 12 and 13 may be urged toward each other into clamped relation with the intermediate portion 11. A rotatable ball 15 is disposed within the interior valve chamber 17 of the housing 10, said ball 15 being rotatable by means of a key generally shown by numeral 16 which engages the ball 15 and constitutes an actuating means.

The relative disposition of valve parts is clearly shown in FIGS. 3 and 4, and it will be observed from FIG. 3 that the intermediate body portion 11 includes a valve chamber 17 defined by a cylindrical inner face 18 and the circumferential margins of opposed end bearing faces 19. The end portions 12 and 13 include apertures 20 and 21, respectively, communicating with the interior valve chamber 17 and constituting inlet and outlet ports. Said end portions 12 and 13 also include abutment faces 23 and 24 respectively, each of said faces 23 and 24 being engageable with an associated bearing face 19 of the intermediate portion 11 when the fasteners 14 are tightened. Each of the end portions 12 and 13 is internally threaded to suit compatibly threaded hydraulic piping (not shown) in the hydraulic system of which the valve forms a part.

The ball 15 is essentially a truncated sphere and includes a central aperture 22, defined by opposed flat annular margins 25, said aperture 22 constituting a first conduit. An arcuate groove 26 constituting a second conduit, is disposed on the face of the ball 15. In the open position of the valve, the inlet and outlet apertures 20 and 21 are in substantial axial alignment with the central aperture 22 and define a central flow axis indicated by arrow F1. The diameter of the central aperture 22 and the diameters of the inlet and outlet apertures 20 and 21 are substantially equal and when the ball valve is open, these openings are in register.

The arcuate groove 26 is disposed substantially transversely of the central aperture 22. Thus, when the rotatable ball 15 is oriented to its cut-off position, as indicated in FIG. 3, and the inlet aperture is, therefore, presented with the sealed imperforate face of the ball 15, flow through the valve in the direction of the main flow axis F1 is precluded. When the main flow is cut off, the arcuate groove 26 provides a communicating conduit between the outlet port 21 and an orifice 43 located in the bottom of the housing 10. Arrows F2 and F3 indicate the path of the flow between the outlet port 21 and the orifice 43.

The housing intermediate portion 11 includes opposed annular grooves 27 in the bearing faces 19 which accommodate O-rings 28 of Teflon or similar material. It will be understood that these O-rings 28 provide a seal between the housing intermediate portion 11 and the end portions 12 and 13. The grooves 27 have a depth slightly less than the diameter of the O-rings 28 to effectuate this sealing.

A pair of sealing rings 30 of Teflon or other suitable material provide a seal between the rotatable ball 15 and the housing 10. The sealing rings 30, shown in FIGS. 5 and 6, are annular in configuration and include a cylindrical face 31, coaxially received within the cylindrical valve chamber 17, and transverse front and rear faces 32 and 33 respectively. As shown in enlarged FIG. 7, the corner between faces 31 and 33 is cut away at a slope of 30° to the flow axis F1 to provide a contiguous chamfered face 34 constituting a depressed portion between the cylindrical face 31 and the transverse face 33. As shown in FIG. 7, the chamfered face 34 cooperates with the cylindrical wall 18 of the valve chamber 17 to define a void 35.

The front transverse face 32 includes a shoulder portion 36 flanked by chamfered faces 37 and 38 which are each sloped at forty-five degrees (45°) to the flow axis F1. Chamfered face 37 constitutes a depressed portion of the transverse face 32 disposed radially inwardly of the shoulder 36 and cooperating with the abutment face 24 to define a void 40. Chamfered face 38 leads into a substantially vertical face 39 and said faces 38 and 39 constitute a depressed portion of the transverse face 32 disposed radially outwardly of the shoulder portion 36 and cooperating with the abutment face 24 to define a void 41.

FIG. 7 indicates the relative disposition of the ring 30 when the end portions 12 and 13 are in contact with the ring but before tightening of the fasteners 14: at this stage, the ring 30 is not yet under pressure. It will be understood that for illustrative purposes, the ball 15 is assumed as being centrally located within the valve chamber 17, each of the rings 30 being disposed substantially equally about the vertical axis of rotation of the valve.

The ring 30 includes an inner aperture 42 having a diameter substantially equal to the central aperture 22 passing through the ball 15. The apertures 42 and 22 are in register with each other and with the housing inlet and outlet apertures 20 and 21 respectively, to facilitate smooth fluid flow through the valve.

The ball 15 is seated on the ring 30, and for this purpose, the ring 30 includes an oblique, bearing face 45 extending between the cylindrical face of the aperture 42 and the rear transverse face 33. The oblique face 45 is disposed at 45° to the flow axis F1 and is thereby substantially tangential to the surface of the ball 15. This arrangement of parts results in a line of pressure at the point of tangency indicated by numeral 46.

It will be observed from FIG. 7 that engagement between the shoulder 36 and the abutment 23 is spread over an annular area and that seating engagement of the ball 15 relative to the flow axis F1 is disposed radially outwardly of the innermost engagement between the shoulder 36 and the abutment 23 when the ring is uncompressed.

FIG. 8 indicates the disposition of parts when the fasteners 14 are tightened so that the end portions 12 and 13, and consequently the abutment faces 23 and 24, are drawn toward each other and more particularly into substantial engagement with the associated bearing faces 19 of the intermediate portion 11. It will be observed from FIG. 7 that the shoulder 36 projects beyond the bearing face 19 in the uncompressed ring position. When pressure is applied to the shoulder 36 by the abutment face 23, the ring 30 tends to compress and pressure is thereby transmitted to the ball 15 at the seating location on the oblique face 45. In this respect, the voids, indicated on FIG. 7 by numerals 35, 40 and 41, are of particular significance and result in a pressure distribution which would be quite different if the voids were not provided. For example, if the voids 40 and 41 were to be filled with ring material, the pressure of the ring material against the ball 15 would be distributed over a relatively greater area on either side of the point 46 resulting in the ball edge 47 being relatively pushed into the ring material. However, the provision of voids 40 and 41 flanking the shoulder 36, results in redistribution of the ring material and said voids 40 and 41 are progressively diminished as pressure is increased. In particular, the application of pressure to the face of the shoulder 36 is transferred to the ball seating portion of the oblique face 45 directly. Obviously, there is no pressure applied to the face 37 or faces 38 and 39, which constitute the depressed portions of the transverse face 32, and consequently, pressure tends to be distributed in a concentrated manner across the ring more or less directly to the pressure center represented by point 46. For example, no pressure can be applied to the face 37 and in consequence of this, pressure is not distributed from this face directly to the opposed portion of the oblique face 45 in the vicinity of the edge of the ball 47. As a practical matter, there may be some slight pressure distribution in the vicinity of the ball edge 47, but it is much less than it would be if the voids 40 and 41 were not provided.

The above arrangement is particularly important because if significant pressure were to exist between the ball edge 47 and the ring material, there would be a tendency for the ball edge 47 relatively to bite into the ring material. This would render rotation of the ball 15 particularly difficult and cause severe binding of the ball 15.

The provision of the void 35 between the cylinder face 18 and the ring 30 has been found to facilitate the pressure redistribution and this void 35 is likewise progressively diminished as pressure is applied to the shoulder 36. It will be understood that the application of pressure to the ring 30 and the consequent redistribution of material under pressure increases the pressure between the circumferential ring face 31 and the cylindrical valve chamber wall 18, particularly in view of the oblique ball seating face 45. Obviously, this pressure increases the sealing capability between the ring 30 and the cylinder wall 18.

When the ball 15 is in an open position, as shown in FIG. 7, or in a closed position, as shown in FIG. 3, there is a continuous circle pressure between the ball 15 and the ring 30. However, when the ball 15 is in an intermediate position between the open and closed positions, as indicated in FIGS. 9 and 10, the pressure acts on only a partial circle. The force applied against the ring 30 is therefore distributed in a more concentrated manner and if significant biting were to exist between the engaging portion of the edge 47 and the oblique face 45 of the ring 30, the biting action would be increased, thereby increasing the tendency to bind. The importance of avoiding serious binding between the edge 47 and the oblique face 45 is, therefore, of great significance. There is some indication that under rotation, the pressure line 46 moves radially relative to the flow axis F1 as part of the ball edge 47 moves out of engagement with the ring 30. Apparently, the displacement continues until full engagement is once more achieved after the ball 15 has been rotated through a complete right-angle. It is believed that the provision of voids 40 and 41 precludes excessive binding which would otherwise tend to occur as a result of this shaft of the bearing line.

The mechanism by which the ball 15 is rotated is clearly illustrated in FIG. 4. This mechanism or actuating means comprises essentially a key 16 which includes a handle 50 cranked to provide a handhold portion 51 which is preferably covered with plastic. The handle 50 includes a downwardly depending lip 52 and a slot-shaped hole 53 which receives the compatibly shaped end 55 of a rotatable shaft 54. The shaft end 55 is threaded to receive a nut 56 whereby the handle 50 and the transverse shaft 54 are secured together to form effectively an integral key. It will be observed from FIG. 3 that the housing intermediate portion 11 includes a hub 29 having a central aperture 57 which receives the key shaft 54 in rotatable relation. The shaft 54 is grooved to accommodate a pair of O-rings 58 of rubber or other suitable material. At its remote end, the shaft 54 includes a head 60 providing an annular shoulder 61. The hub aperture 57 includes a socketed portion 59 receiving the annular shoulder 61 and precluding outward movement of the key shaft 54. Importantly, the head 60 includes a projecting arcuately configured plug 62, constituting a shoulder portion, and the plug 62 engages a compatibly configured groove 63 provided in the rotatable ball 15, the groove 63 constituting an abutment portion engageable by said plug 62. With this arrangement, the ball 15 may be rotated by simply turning the handle 50.

It will be observed from FIGS. 1 and 2, that the housing intermediate portion 11 includes right-angularly related stop elements 64 and 65 which are engageable by the depending lip 52 of the handle 50 to limit rotation of the key 16 and define the valve cut-off and valve open positions.

It is thought that the structural features and functional advantages of this ball valve, particularly the seal between the rotatable ball 15 and the housing 10 have become fully apparent from the foregoing description of parts, but for completeness of disclosure, the installation and operation of the device will be briefly summarized.

The assembly of the valve is commenced by installing the key shaft 54 into the hub aperture 57 from the interior of the valve chamber 17. During installation, the key shaft 54 must be oriented as indicated in FIG. 3, because of the structural arrangement of the engaging shaft plug 62 and the compatible ball groove 63. In effect, the ball 15 is rolled into position within the cylindrical valve chamber 17. The diameter of said valve chamber 17 and the overall length between adjacent bearing faces 19 are substantially equal to each other and slightly greater than the diameter of the ball 15. The sealing rings 30, which are a push-fit within the chamber 17, are disposed on either side of the ball 15 and the flat face 39 of the ring 30 is substantially aligned with bearing face 19 so that the shoulder 36 projects beyond said bearing face 19, as is clearly shown in FIG. 7. When the fasteners 14 are tightened together to draw the abutment faces 23 and 24 of the end portions 12 and 13 into contact with the bearing faces 19, the ring 30 is distorted in the manner shown in FIG. 8. Observation of FIG. 7 reveals that if the void 40, for example, were occupied by ring material, the pressure applied to the re-defined shoulder, which would extend to the face of inlet port aperture 20, would urge the ring material directly into the edge 47 of the ball 15. Because of the void 40, this does not occur and, further, it has been found to be advantageous to have the disposition of parts arranged so that the center of the shoulder 36 is substantially in alignment with the theoretical line of the ball seating engagement represented by numeral 46.

Although the exact manner in which the ring 30 distorts must, to some extent, be hypothesised, it appears that there is a tendency for the mass of the ring 30 to rotate about point 46 when pressure is applied to the shoulder 36. The provision of voids 35, 40 and 41 at specific locations relieves the pressure which would otherwise build up at these locations, with the result that the voids diminish as the ring material is distorted by compression. Obviously, the exact nature of the redistribution of the ring material is complex but it is believed that the above explanation will be helpful to the understanding of the superior non-binding rotation of the ball 15 which is experienced with a ring configuration provided with relatively depressed portions, which result in the formation of voids 35, 40 and 41.

It will be understood that when the ball 15 is in the closed position, the pressure on the upstream side of the ball 15 tends to urge said ball 15 in a downstream direction. In this position, the disposition of parts is as indicated in FIG. 3 and the connection of the shaft 54 between the ball 15 and the handle 50 permits a fractional amount of movement of the ball 15 downstream. Pressure against the closed face of the ball 15, in effect, tends to augment pressure on the downstream sealing ring 30 and to relieve pressure on the upstream sealing ring 30. The upstream seal is not destroyed, however, because the precompression of the sealing rings 30 is sufficiently great that the upstream sealing ring 30 is always under compression. The precompression is controlled by the projection of each shoulder 36 beyond the opposed bearing faces 19 and, as a practical matter, this projection amounts to between ten and twenty thousandths of one inch on a ball valve having a nominal conduit diameter of between 1 and 2 inches.

After the handle 50 has been attached to the key shaft 54, rotation of the ball 15 is effectuated by turning said handle 50. The stop 64, which is oriented perpendicularly to the principal flow axis F1, and the stop 65, which is oriented in a direction parallel to said flow axis F1, are engageable by the depending lip 52 on the elongate handle 50. When the handle 50 is rotated into axial alignment with the principal flow axis F1, the central aperture 22 of the ball 15 is in alignment with the inlet and outlet port apertures 20 and 21 and the valve is in a first open position. When the handle 50 is disposed transversely of the flow axis F1, the face of the ball 15 blocks flow between the inlet and outlet port apertures 20 and 21 and the valve is in a second closed position in which the flow of fluid follows the path indicated by arrows F2 and F3. Thus, the stop elements 64 and 65 provide a limit means between open and closed valve positions. In the second, closed position, the arcuate groove 26 communicates between the outlet port 21 and the orifice 43 in the bottom of the housing 10. Thus, although the main flow is cut off, backflow through the outlet 21 to the orifice 43 is possible and fluid in the downstream of the system may be bled through said orifice 43. It will be understood that flow from orifice 43 may be directed to a remote point by means of auxiliary piping (not shown) connected to said orifice 43. Alternatively, a stopcock may be utilized to provide selective restriction of the flow. Further, the ball valve arrangement outlined above lends itself readily for use as a three-way valve by utilization of the orifice 43 as an exit port.

We claim as our invention:

1. A ball valve comprising:
   a. a body including:
      1. a valve chamber having opposed ends and a longitudinal axis,
      2. inlet and outlet ports disposed at opposite ends of the valve chamber,
      3. abutment means disposed at one end of the valve chamber,
      4. a cylindrical face disposed at one end of the valve chamber,
   b. a rotatable ball disposed within the valve chamber and including a conduit selectively communicating with said inlet and outlet ports,
   c. means urging the abutment means toward the ball,
   d. a compressible sealing ring disposed at one end of the valve chamber between the ball and the abutment means, said ring including:
      1. a transverse face transversely disposed of the longitudinal axis of the valve chamber and including:
         I. shoulder means engageable with the abutment means,
         II. a depressed portion radially adjacently disposed inwardly of said shoulder means and cooperating with said abutmeans to define a void when the ring is uncompressed, said void being progressively diminished by redistribution of the ring material as the abutment means is urged towards the ball means,
      2. a cylindrical face coaxially received within the cylindrical face of the valve chamber, said faces being in engagement over the major portion of the ring thickness when the ring is uncompressed and when the ring is compressed, and
      3. seating means disposed in angular relation to the longitudinal axis of the valve chamber and engaging the ball radially outwardly of the innermost engagement of the shoulder means and the abutment means when the ring is uncompressed.

2. A ball valve as defined in claim 1, in which:
   e. the abutment means includes a flat portion, and
   f. the depressed portion of the transverse face includes a flat portion disposed radially outwardly of the shoulder means,
   g. said flat portions being disposed in spaced parallel relation when the ring is uncompressed and being engageable when the ring is compressed.

3. A ball valve comprising:
   a. a body including:
      1. a substantially cylindrical valve chamber having opposed ends and a longitudinal axis,
      2. abutment means disposed in selectively spaced relation at each end of the valve chamber, and defining inlet and outlet ports, and
      3. bearing means disposed at one end of the valve chamber in selectively spaced relation from an associated abutment means,
      4. means urging said bearing means and abutment means toward each other,
   b. a rotatable ball disposed within the valve chamber and including a conduit selectively communicating with said inlet and outlet ports,
   c. a pair of compressible annular sealing rings disposed at opposite ends of the valve chamber, each ring being disposed between the ball and an associated abutment means, each sealing ring including:
      1. a cylindrical face coaxially received within the cylindrical valve chamber, 2. a transverse face transversely disposed of the longitudinal axis of the cylindrical valve chamber and including:
   I. shoulder means engageable with an associated abutment means, and
   II. a depressed portion radially adjacently disposed of said shoulder means and cooperating with said associated abutment means to define a void when the ring is uncompressed, said void being progressively diminished by redistribution of the ring material as the bearing means and abutment means are urged toward each other, and
   3. seating means disposed in angular relation to the longitudinal axis of the valve chamber and engaging the ball radially outwardly of the innermost engagement between the shoulder means and the abutment means when the ring is uncompressed, and
d. the shoulder means of at least one of said rings projecting outwardly of the bearing means when the rings are uncompressed.

4. A ball valve as defined in claim 3, in which:
e said cylindrical face of at least one ring being in engagement with the valve chamber over the major portion of the ring thickness when the ring is uncompressed and when the ring is compressed, and
f. said one ring includes a depressed portion contiguous with the cylindrical face and cooperating with the valve chamber to define a void when the ring is compressed, said void being progressively diminished by redistribution of the ring material as the bearing means and associated abutment means are urged toward each other.

5. A ball valve as defined in claim 3, in which:
e. the abutment means includes an annular bearing face,
f. the shoulder means includes inner and outer edges defining an annular bearing face parallel with the annular bearing face of the abutment means and engageable therewith during compression of the ring,
g. the seating means includes an oblique face receiving the ball, the engagement between the ball and said oblique face defining a circumferential pressure line having a radius between the radii of the inner and outer edges of said annular bearing face when the ring is uncompressed.

6. A ball valve comprising:
a. a body including:
   1. an intermediate portion including a cylindrical valve chamber having opposed ends, a longitudinal axis and opposed bearing faces disposed at each end of the valve chamber,
   2. a pair of end portions including opposed abutment faces defining inlet and outlet ports communicating with the valve chamber, each abutment face being adjacently disposed of an associated bearing face, and
   3. fastening means between said intermediate and end portions urging associated bearing and abutment faces into clamped relation,
b. a rotatable ball disposed within the valve chamber and including a conduit selectively communicating with said inlet and outlet ports,
c. a pair of compressible annular sealing rings disposed at opposite ends of the valve chamber, each ring being disposed in engaging relation between the ball and an associated abutment face, each sealing ring including:
   1. a cylindrical face coaxially received within the cylindrical valve chamber and being in engagement with the valve chamber over the major portion of the ring thickness when the ring is uncompressed and when the ring is compressed,
   2. a transverse face, transversely disposed of the longitudinal axis of the cylindrical valve chamber and including:
      I. an annular shoulder engageable with an associated abutment face the distance between the shoulders of opposed rings being greater than the distance between the bearing faces of the intermediate portion whereby said shoulders projects outwardly beyond the valve chamber when the rotatable ball is substantially centered within the valve chamber and the rings are uncompressed, and
      II. a depressed portion radially adjacently disposed of said shoulder and cooperating with associated abutment face to define a void when the ring is uncompressed, said void being progressively diminished by redistribution of the ring material as the end portion abutment faces are urged into clamped relation with the intermediate portion bearing faces, and
   3. a seating face disposed in angular relation to the longitudinal axis of the valve chamber and engaging the ball.

7. A ball valve as defined in claim 6, in which:
d. the depressed portion of each ring includes a first portion disposed radially inwardly of the shoulder and a second portion disposed radially outwardly of the shoulder and
e. the seating face engages the ball radially outwardly of the innermost engagement between an associated shoulder and abutment face when the ball is uncompressed, and
f. the ball conduit includes a margin portion having a circumferential edge substantially coaxially alignable with the longitudinal axis of the valve chamber and disposed radially inwardly of the innermost engagement between an associated shoulder and abutment face when the ball is uncompressed.

* * * * *